United States Patent [19]
Redmond et al.

[11] 4,091,734
[45] May 30, 1978

[54] AIRCRAFT TO WEAPON FUZE COMMUNICATION LINK

[75] Inventors: Stephen L. Redmond; Steven E. Fowler, both of Ridgecrest, Calif.

[73] Assignee: The United States of America as represented by the Secretary of the Navy, Washington, D.C.

[21] Appl. No.: 770,872

[22] Filed: Feb. 22, 1977

[51] Int. Cl.² ............................................. F42C 15/40
[52] U.S. Cl. ................................. 102/70.2 R; 250/199
[58] Field of Search ...................... 102/70.2 R, 70.2 P; 250/199

[56] References Cited

U.S. PATENT DOCUMENTS

| | | | |
|---|---|---|---|
| 3,228,337 | 1/1966 | Grantham et al. | 102/70.2 R |
| 3,306,206 | 2/1967 | Grantham | 102/70.2 R |
| 3,667,342 | 6/1972 | Warnock et al. | 102/70.2 R |
| 3,667,392 | 6/1972 | Grantham et al. | 102/70.2 R |
| 3,703,145 | 11/1972 | Burkhardt et al. | 102/70.2 R |

*Primary Examiner*—Charles T. Jordan
*Attorney, Agent, or Firm*—R. S. Sciascia; Roy Miller

[57] ABSTRACT

An aircraft-to-weapon fuze communication link that transfers fuzing information between the aircraft and weapon via an optical data and power link in the absence of any physical connection. The information is transferred via an infrared light beam in digital format. Power to run the fuze receiver during the data transfer process is supplied from a high power light source.

9 Claims, 11 Drawing Figures

AIRCRAFT TO WEAPON FUZE COMMUNICATION LINK

CROSS-REFERENCE TO RELATED APPLICATION

Copending U.S. patent application Ser. No. 770,871 filed Feb. 22, 1977 by Stephen L. Redmond and Steven E. Fowler.

BACKGROUND OF THE INVENTION

1. Field of the Invention

The Navy has the present capability of communicating in flight with free-fall weapon fuzes. However, a major problem, in current aircraft, is the proliferation of wires for weapon communication. Various concepts are being studied to minimize communication wires among which is one using multiplexing techniques. In this system, the fuze function control needs will also be integrated into the system. X-ray and optical techniques are also being studied as ways of providing fuze communication without a direct wiring connection. Both the X-ray and optical systems use digital techniques to provide greater potential reliability by eliminating the necessity for the arming crew to mate electrical connectors under the hurried environment during strike-up operations aboard an aircraft carrier deck and expanded data capacity over the present limited DC voltage level system.

2. Description of the Prior Art

Various fuze function control sets are presently in the Navy inventory. Among these are the AN/AWW-1, -2, -4 fuze function control sets. These sets are capable of selecting one of four fuzing modes (proximity, instanteous upon target impact, or one of two delay times after impact) by applying a specific DC voltage to the electric bomb fuze at the time the weapon is released. The voltage levels used are +300, +195, −195, −300 volts, transmitted via a single umbilical cable between the aircraft and the weapon. The Mark 122 arming safety switch on the weapon is used to prevent voltage application to the fuze until the weapon is released. This voltage level transfer is achieved through a lanyard and umbilical connection. The Mark 39 quick-disconnect receptacle is the major component of the electric bomb fuze system on the bomb rack side of the interface. Because of wide variations in bomb rack design, the Mark 39 receptacle appears in many forms. This particular system has experienced problems with its numerous electrical connections, particularly in high humidity environments.

The prior art system is illustrated in FIG. 1. FIG. 1 shows a bomb with an umbilical which is used to transfer the fuzing information between the aircraft and the weapon, the fuze arming wires which arm a mechanical nose fuze and an electric tail fuze and a fin release wire.

SUMMARY OF THE INVENTION

Figure 2:
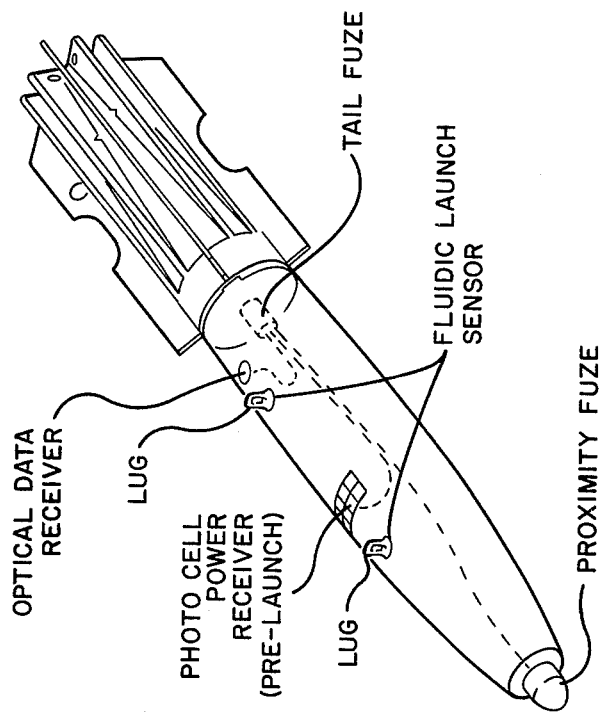
FIG. 2 is the proposed configuration.
Figure 1:
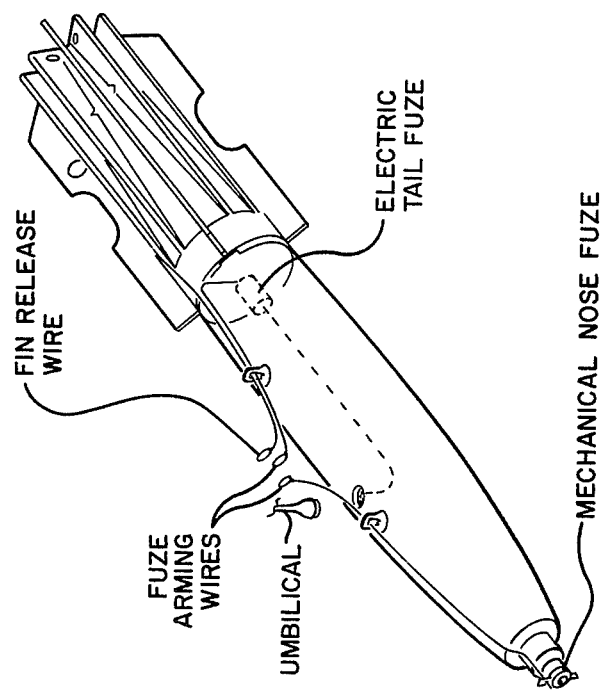
FIG. 1 illustrates the prior art.

The aircraft-to-weapon fuze communication link transfers fuzing information between the aircraft and weapon via an optical link in the absence of any physical connection therebetween. The information, which is in a digital format, is transferred via an infrared light beam. Power to run the fuze receiver during the data-transfer process is supplied from a high-power light source. The concept is illustrated in FIG. 2. Both the optical data and power transmitters are located in the aircraft weapon rack and the receiver is in the weapon. The data and power are transmitted while the weapon is still mounted on the rack and just prior to launch of the weapon.

The system transmits three fuzing functions to a free-fall weapon fuze. The optical system can be used with any other fuze requiring communication. In the present system, the three functions transferred are delivery mode (high or low drag), arming time, and target fuzing mode (proximity, instantaneous, and two penetration timed delays). This data can either be transferred to the fuze via the optical link prior to launch or preset by an ordance man prior to flight.

DESCRIPTION OF THE PREFERRED EMBODIMENTS

FIG. 2 illustrates the concept upon which the invention is founded and shows a free fall weapon, a bomb having a proximity fuze in the nose thereof, a tail fuze and two lugs incorporating fluidic launch sensors. A photo-cell power receiver is incorporated into the skin of the bomb and is used to provide power to the weapon while the weapon is still mounted on the bomb rack of the aircraft and just prior to launch. An optical data receiver, also in the bomb housing, is provided to receive encoded data transmitted via an optical link from a transmitter on the bomb rack.

Figure 3:
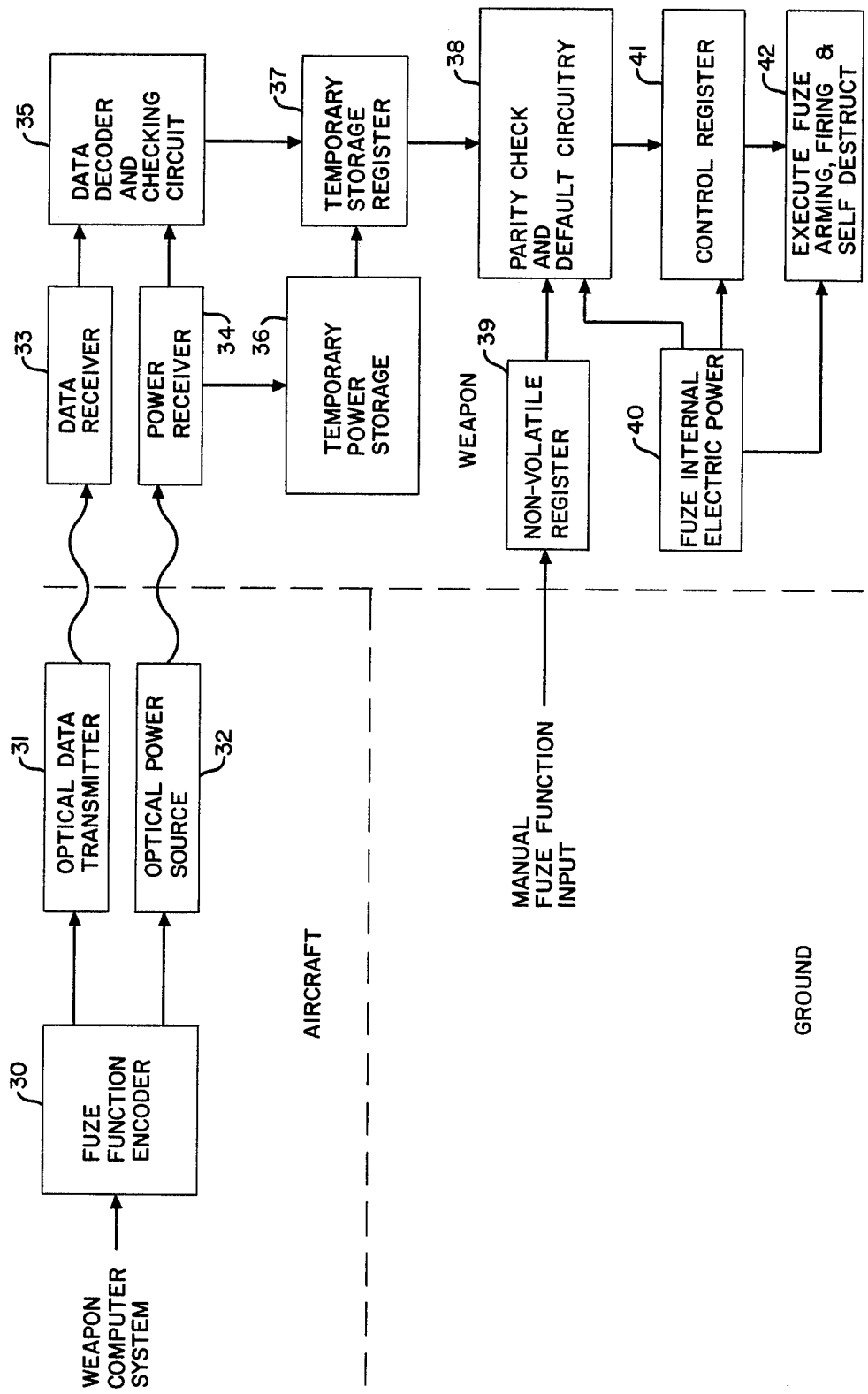
FIG. 3 is a block diagram of the optical data/power link system.

The optical data power link system is set forth in FIG. 3 wherein a fuze function encoder 30 receives information from the weapon computer system aboard the aircraft. The fuze function encoder outputs an output to an optical data transmitter 31 and an optical power source 32. The optical data transmitter transmits via an infrared link to a data receiver 33 contained in the free fall weapon. At the same time, the optical power source 32 transmits a high power light beam to a power receiver 34 also contained on the free fall weapon.

The power receiver 34 outputs power to the system and specifically to a data decoder and checking circuit 35 and a temporary power storage 36. The data receiver also outputs information to the data decoder and checking circuit 35 which in turn decodes, verifies and checks that data and provides an output to a temporary storage register 37. The output of the temporary storage register is an input to a parity check and default circuit 38 which also receives an input from a nonvolatile register 39. The nonvolatile register receives an input at the time the weapon is loaded on the aircraft when the ordnanceman manually sets switches on the weapon to provide a manual fuze functioning input. The parity check and default circuitry 38 also receives an input from a fuze internal electric power source 40 which also provides power to a control register 41 and a fuze arming firing and self destruct circuit 42. Control register 41 also receives the output of parity check and default circuitry 38.

Figure 4:
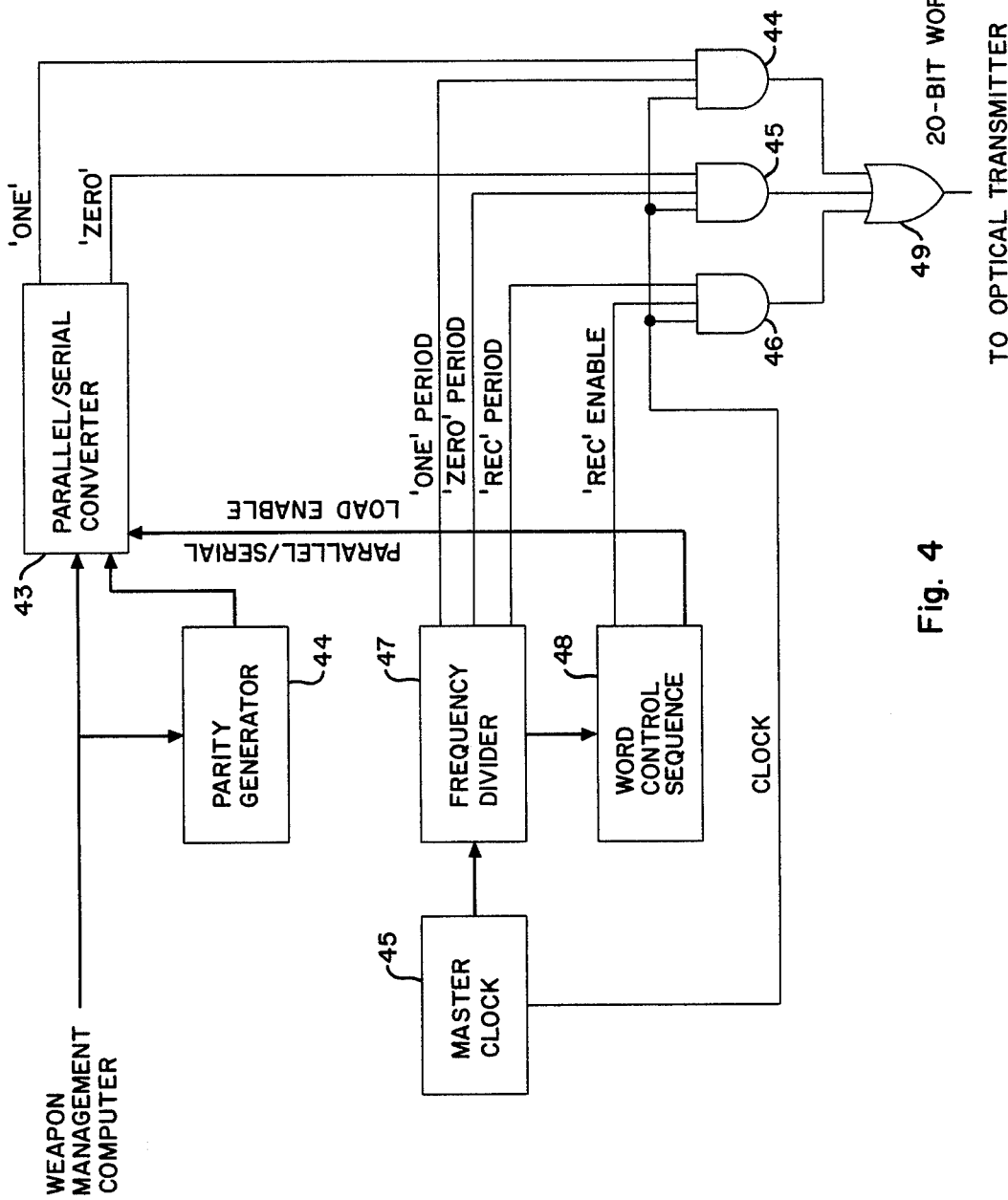
FIG. 4 is a block diagram of the fuze function encoder of FIG. 3.

The fuze function encoder 30 of FIG. 3 is shown in greater detail in block diagram form in FIG. 4. An input from the onboard weapon management computer is inputted to a parallel-to-serial converter 43 and as an input to parity generator 44. The parity generator outputs a signal which is connected as another input to the parallel-to-serial converter 43. The parallel-to-serial converter 43 outputs "ones" and "zeros" on two lines which are coupled as inputs to AND gates 44 and 45 respectively.

A master clock 45 outputs a continuous square wave signal as one input to the AND gates 44 and 45 and another AND gate 46. Another output from the master clock is inputted to frequency divider 47 which provides a "one," "zero" and "receive" output to respective AND gates 44, 45 and 46. The frequency divider also outputs a signal which is inputted to a word control sequence block 48 which in turn provides a parallel-to-serial load enable output to the converter 43 and a receive enable to the AND gate 46. The respective outputs of the AND gates 44, 45, and 46 are coupled as inputs to OR gate 49 the output of which is coupled to the optical transmitter 31 of FIG. 3 as a 20-bit word.

Figure 7:
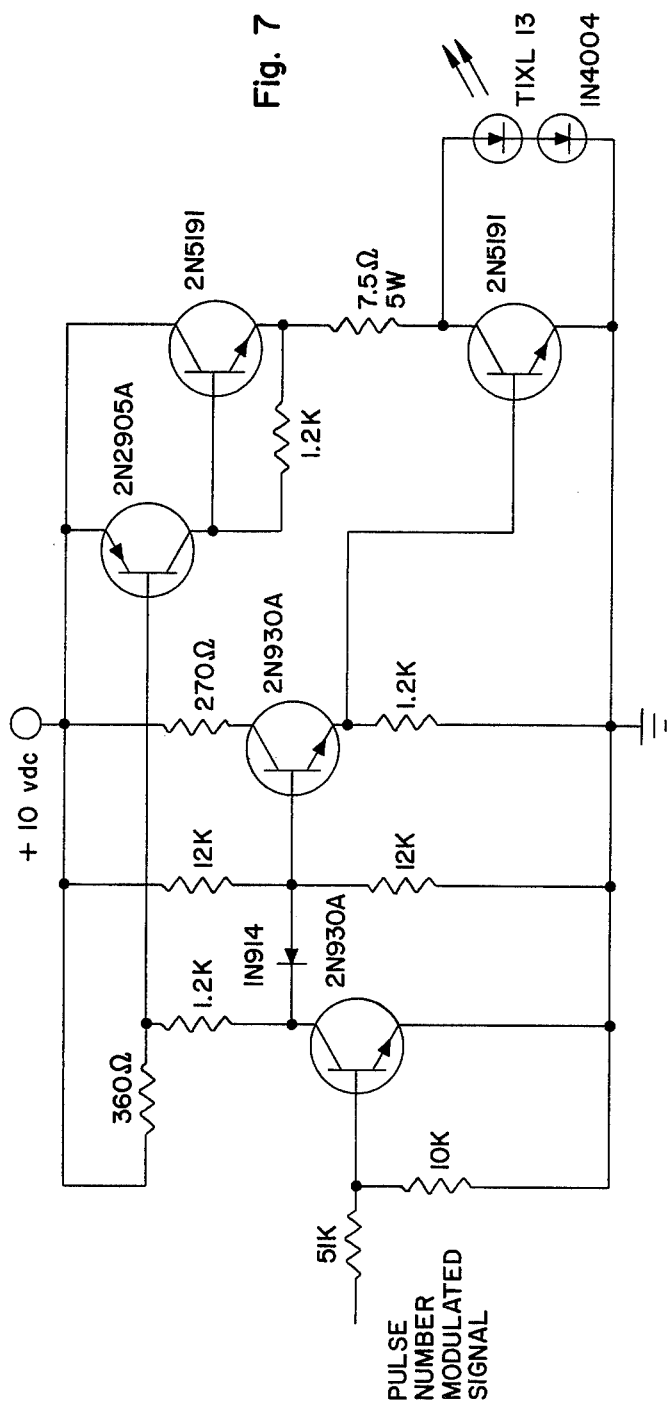
FIG. 7 is a schematic of the optical data transmitter.

The optical data transmitter 31 of FIG. 3 is shown in schematic diagram form in FIG. 7 with the values of components thereon. The optical data transmitter of FIG. 7 receives the pulse number modulated signal outputted from OR gate 49 and transmits an infrared signal in digital format to the optical receiver on the weapon.

Figure 8:
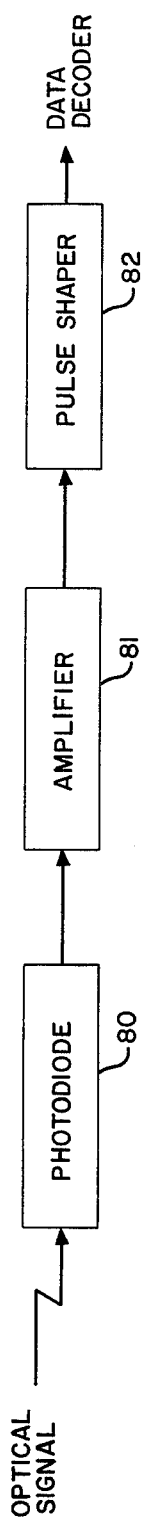
FIG. 8 is a block diagram of the data receiver.

FIG. 8 is a block diagram further showing the data receiver 33 of FIG. 3 in greater detail. An optical signal is received by a photodiode 80 which outputs an electrical signal to amplifier 81 which in turn provides an output to a pulse shaper 82. The output of the pulse shaper 82 is coupled to the data decoder and checking circuit 35 of FIG. 3.

Figure 9:
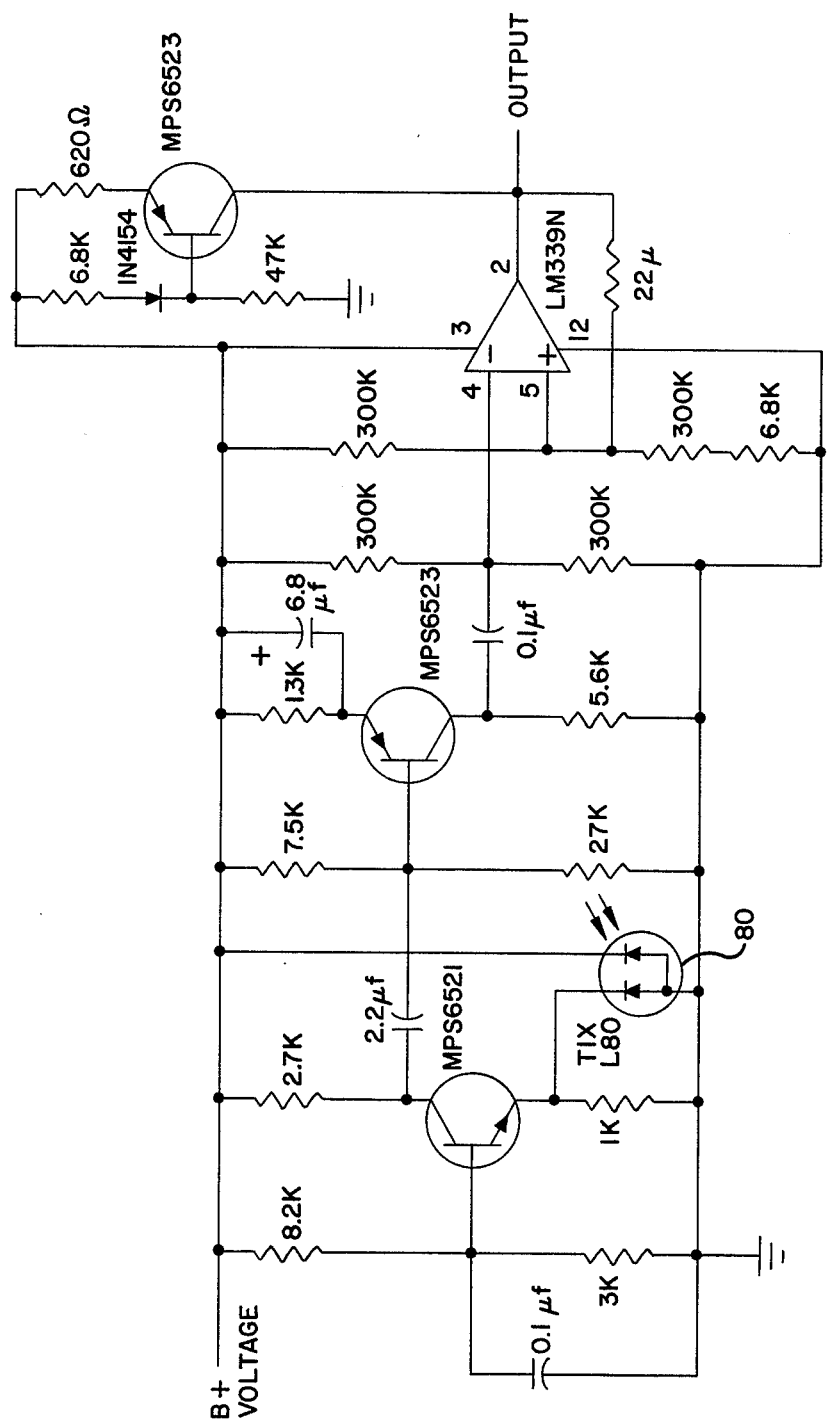
FIG. 9 is a schematic of the optical receiver.

The data receiver of FIG. 8 is set forth in schematic form in FIG. 9 with all the circuit values thereon.

Figure 10:
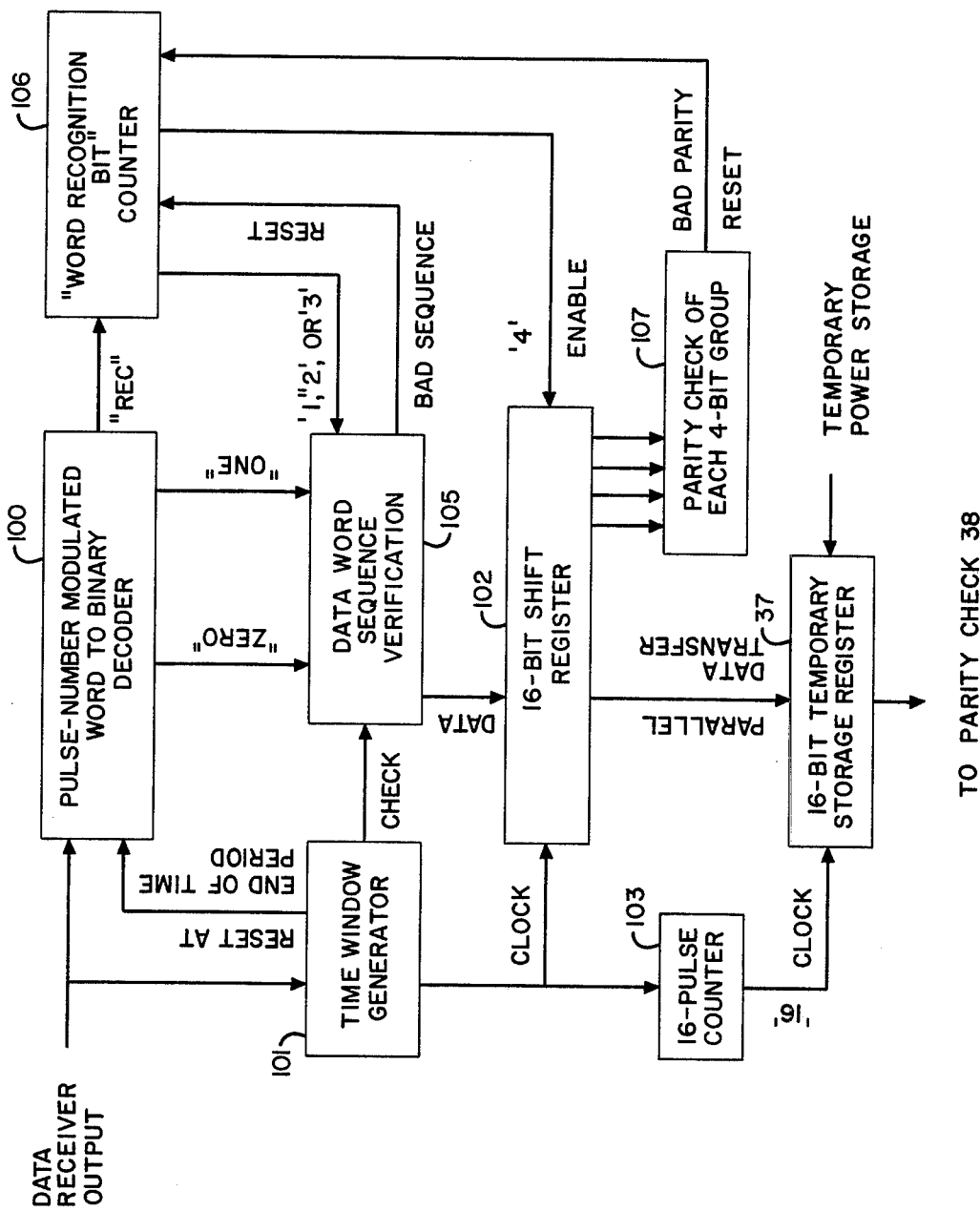
FIG. 10 is a block diagram of the decoder and temporary storage of FIG. 3.

An expanded block diagram of the data decoder and checking circuit 35 and temporary storage register 37 is set forth in FIG. 10. The output of the data receiver 33 of FIG. 3, which comprises a pulse-number modulated word, is inputted to a binary decoder 100 and also inputted to a time window generator 101. The time window generator 101 provides an output comprising a clock pulse to a 16-bit shift register 102 and a pulse counter 103. The pulse counter 103 outputs a clock pulse to the 16-bit temporary storage register 37 which in turn provides an output which is coupled to the parity check circuit 38 of FIG. 3.

The time window generator provides another output to a data word sequence verification block 105 and another output which comprises a reset pulse to the binary decoder 100. The binary decoder provides "zero" and "one" outputs to the data word sequence verification block 105 and a receive output to a word recognition bit counter 106. Counter 106 outputs an enable pulse to the 16-bit shift register 102 and another output comprising a "1," "2" or "3" to the verification block 105.

The 16-bit shift register provides an output to the 16-bit temporary storage register in parallel and also provides outputs to a parity check block 107 which in turn provides an output corresponding to a bad parity reset to the word recognition bit counter 106. The counter 106 also has an input coupled thereto from the verification block 105 corresponding to a bad sequence reset.

Figure 11:
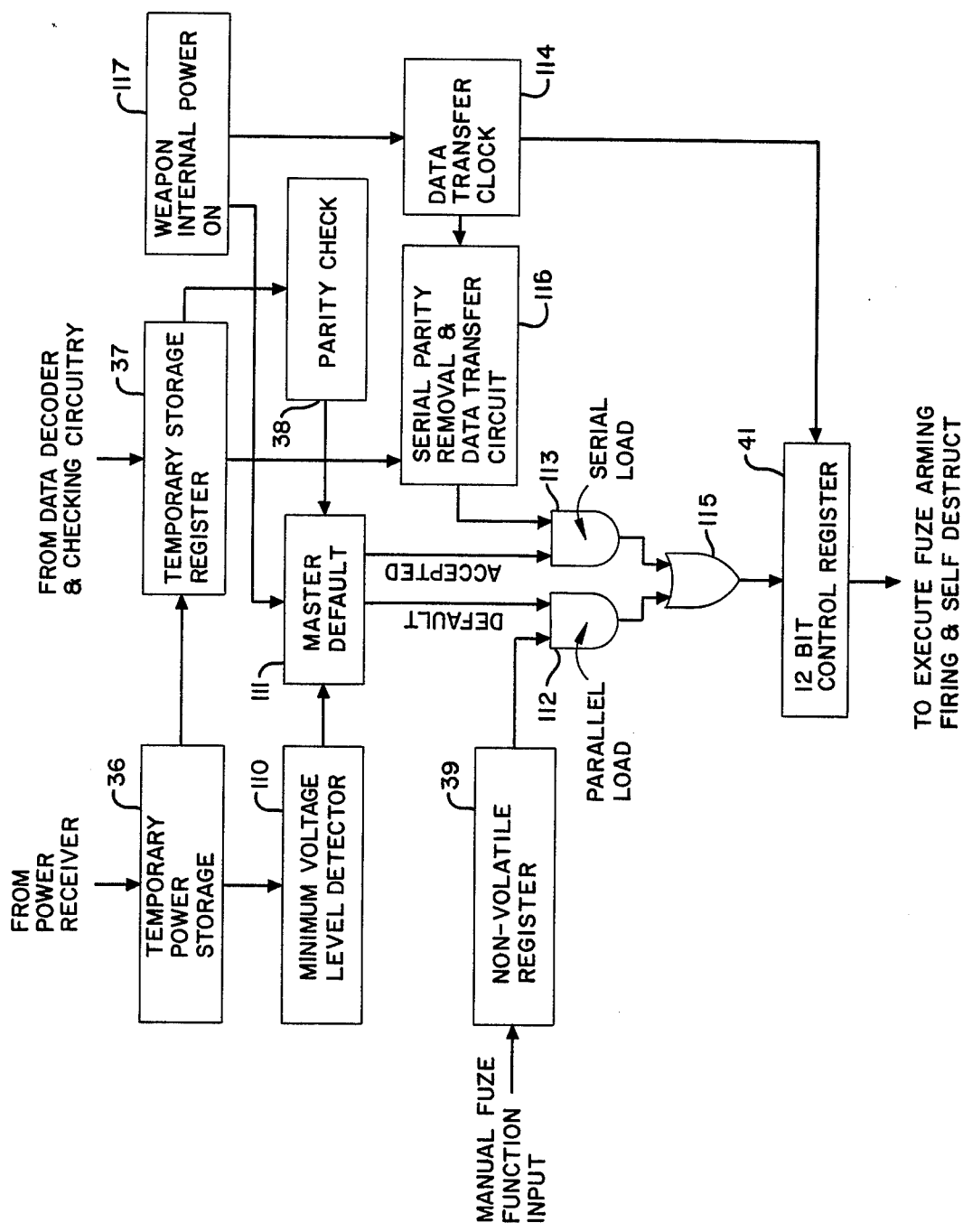
FIG. 11 is a block diagram of the default circuit and control register of FIG. 3.

The default circuitry in block 38 of FIG. 3 and the control register 41 are shown in an expanded block diagram in FIG. 11. The temporary power storage 36 receives an input from the power receiver 34, FIG. 3, and couples an output to a minimum voltage level detector 110. The minimum voltage level detector provides an output to a master default circuit 111 which in turn outputs either a signal corresponding to "default" or "accepted" to respective AND gates 112 and 113.

Another output from the temporary power storage 36 is coupled as an input to the temporary storage register 37 which in turn provides an output to the parity check circuit 38 contained in block 38 of FIG. 3. The parity check circuit outputs another output which is coupled as another input to the master default circuit 111. Another output from the temporary storage register 37 is coupled to a serial parity removal and data transfer circuit 116 which in turn outputs another input to AND gate 113.

Weapon internal power is provided by block 117 which has outputs coupled to the master default circuit 111 and a data transfer clock 114. The data transfer clock provides an output which is coupled as an input to the data transfer circuit 116 and another output to the 12 bit control register 41 of FIG. 3. The 12-bit control register receives another input from OR gate 115 which in turn accepts the outputs of AND gates 112 and 113.

In operation, prior to loading the weapon onto the delivery aircraft, the ground crew presets the weapon fuze for the general type of mission to be flown. This is done by switching two rotary switches, not shown, to the appropriate setting. One switch controls the delivery mode and the other switch the fuzing mode. This preset command is stored in the nonvolatile register 39 and is used in the event there is a failure in the communication link or if the delivery aircraft is not equipped with an optical communication link.

Prior to weapon release, the pilot sets the fuze function control set for the type of weapon desired, delivery mode and fuzing mode. When the intent-to-launch command is given, the computer on board the aircraft determines the delivery maneuver and computes the proper arming time. All of this data plus power to operate the communication link is optically transmitted to the weapon fuze. The data being received by the weapon fuze must be verified and if it is an acceptable data word, it is temporarily stored until internal weapon electric power comes on.

When internal weapon power comes on, the data word stored in register 37 is again checked for validity. If the word is still valid, it is transferred into the fuze control register 41. If something had happened to the stored word prior to the internal power coming on, then the preset word would be transferred into the control register 41. The control register controls the execute fuze arming firing and self destruct circuits 42 which perform various functions depending on the type of weapon fuze.

Figure 6:
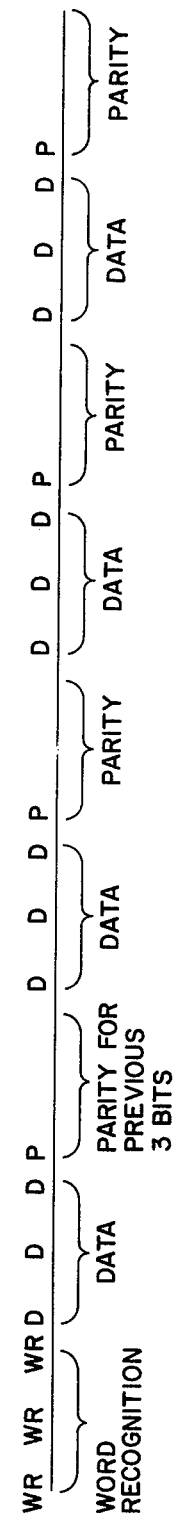
FIG. 6 is an illustration of the encoded data word.

Briefly, the fuze function encoder 30 receives a binary digital word from the weapon management computer and converts it to a trinary pulse-number modulated code. The word contains fuze mode, arming time, weapon trajectery, etc., type data. The encoder receives a 12-bit binary digital word from the weapon station computer as shown in FIG. 6. The 12-bit word contains all necessary fuzing information such as arming time and target fuzing mode. The binary word, which contains "ones" and "zeros" that are synchronized with a clock, must be converted to a signal that is compatable with a single-link optical system. In other words, a binary word cannot be transmitted with a single-link system because there would be no synchronized clock signal to enable recognition of a "0" at the receiver.

Figure 5:
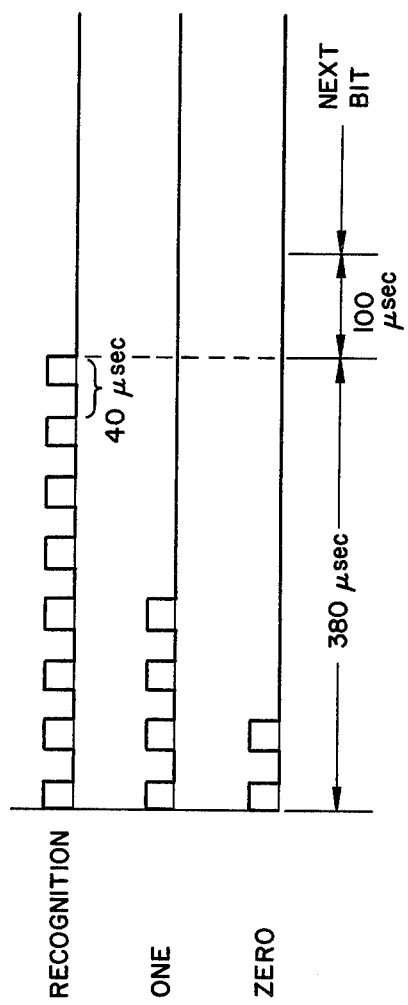
FIG. 5 is a diagram illustrating the trinary pulse number modulation technique utilized.

To solve this problem, there are several techniques for encoding a binary signal into one that is compatable with a pulsed light-emitting diode signal. The technique used for this application is a pulse-numbers scheme as set forth in copending U.S. application Ser. No. 770,871, filed Feb. 22, 1977. Different numbers of pulse bursts are used to signify "ones," "zeros" and "word recognition." FIG. 5 illustrates that 8 pulses are used for word recognition, 4 pulses for a "1," and two pulses for a "0." There is a fixed minimum delay between each burst of pulses in order for the receiver to distinguish between bits. The reason for using the pulse number modulation is to allow the use of an optical receiver with a somewhat low-frequency response which will be therefore less costly and less complex. The low-frequency response means that the received optical pulses will be considerably rounded in appearance after going through the receiver but they will none the less be recognizable by the data decoder. If a pulse-width modulation technique were used instead, a receiver with a better frequency response would be required so that the minimum rounding of the pulses occurs. If too much rounding occurred, then it would be difficult for the decoder to distinguish between the different pulse widths.

The encoder 30, besides generating the pulse-number bits, interjects a series of "word recognition" bits and parity bits into the data word. The purpose of the "recognition" bits are for the receiving decoder to recognize the beginning of a word. The four parity bits, which apply to each group of 3 data bits respectively, are used in the receiver to determine if a good data word has been received. The word layout is shown in FIG. 6.

In FIG. 4, the master clock 45 generates a continuous square-wave signal. The signal is fed into a frequency divider circuit 47 which generates squarewave signals whose time periods are equivalent to the correct number of clock pulses needed for each bit type ("0," "1," or "word recognition"). The frequency divider 47 also outputs a signal to a word-sequence-control counter 48. This counter generates the control for the 4 "recognition" pulses followed by the 16-bit data word. "1's" or "0's" will be generated when the output of the parallel-to-serial converter 43 is a "1" or "0" respectively and during the associated time period determined by the output of the frequency divider to the AND gates 44 and 45.

The optical data transmitter 31 is a light-emitting diode that is pulsed with the modulated word from the encoder 30. The encoder data signal supplies input pulses to the optical transmitter and the transmitter uses an infrared light-emitting diode to produce the optical signal. The low-power signal from the digital circuitry of the encoder is converted to a high-power input to the light-emitting diode via an amplification circuit shown in FIG. 7. The light-emitting diode emits at a 0.93 micrometer wavelength and with a 130° angle between its half power points. The wide angle allows more misalignment between the transmitter and receiver. Separation distances between the transmitter and receiver of 20 inches and misalignments of ± 40° can be tolerated in the present system.

Data receiver 33 is a photodiode that receives the infrared signal from the data transmitter and converts it to a digital signal via a high-gain amplifier. The optical-pulsed signal is sensed by a photodiode 80, see FIGS. 8 and 9. The peak spectral response of the photodiode is matched to the wavelength of the signal from the light-emitting diode in the optical data transmitter 31. The receiver is biased so that ambient light, such as sun light, will not interfere with the data transmission by saturating the receiver amplifiers. The signal from the photodiode 80, which is an electric current source, is fed into a high-gain amplifier 81. The amplifier converts the signal to a voltage and at that point, the voltage pulse, which may have been distorted during transmission and detection, is fed to a comparative/pulse shaper that outputs a more uniform amplitude and shaped pulse. The actual circuitry used is shown in FIG. 9.

The data decoder and checking circuitry 35 decodes the modulated word from the receiver into a binary digital word and verifies that good data has been received. The data, which is still in a pulse-numbered modulated form is transferred to the decoder and checking circuitry 35. The data decoder and checking circuitry 35 and temporary storage register 37 are shown in greater detail in FIG. 10. The decoder converts the modulated word into its binary equivalent, verifies the sequence and accuracy of the word and temporarily stores it in the storage register 37.

Decoding is accomplished by counting the number of pulses received during a predetermined time period. At the end of that time period, the number of pulses counted is interrogated. The logic involved allows for a two-pulse range of acceptance for each type signal ("1," "0," or "word recognition"). The logic involved requires that four or more "recognition" bits in a row be received before binary signals will be accepted. If one, two, or three "recognition" bits are received followed by a binary bit, then the recognition counter 106 is reset and a new group of valid "recognition bits" must be received before the data word is accepted. Once the proper "recognition bits" have been received, the binary bits following will be loaded serially into the 16-bit register 102. If during the data-word receiving process an invalid binary bit is received, the system resets and rejects the data already received. The system then waits for a new word.

As valid bits are loaded into the shift register 102, each group of four are checked for proper parity in parity check circuit 107 (the fourth bit is generated in the encoder to make the group of four bits have even parity). If the four have good parity, which indicates a high probability that the data is valid, the binary bit receiving continues. If the parity is not correct, the system again resets.

When 16 binary bits have been received, the word in shift register 102 is transferred in parallel to the temporary storage register 37. The temporary storage register is powered by a capacitor in power supply 36. With the 500 microfarad capacitor in the power supply 36 charged to 10 volts, data can be reliably stored for approximately 30 seconds.

When the internal power on the weapon comes on, two checks occur. One check is the voltage level of the temporary power supply which is done in the minimum voltage level detector 110. If the voltage is less than 3 volts, it is assumed that data stored in the temporary storage register 37 is no longer valid. The other check is of the parity of the data in the temporary storage register 37. This is done in parity check circuit 38. If either the parity is bad or the voltage level is not correct, the default logic takes some action. The data, which has been previously selected through use of a set of switches and inputted to the nonvalid register 39, is loaded into the control register 41 instead of accepting the data from the temporary storage register 37.

If, however, the master default 111 does not reject the data a different sequence occurs. The data then in the temporary storage register 37 is serially transferred to AND gate 113 and OR gate 115 to the 12-bit control register 41. During that transfer process, the parity bits (every fourth) are removed from the word in the serial parity removal and data transfer circuit 116 since they are no longer needed. The control register 41 is then interrogated by the remainder of the fuze for desired arming time, fuze mode and trajectory.

The optical power source 32, which supplies power for fuze activation during the data transfer period and for temporary data storage, is a high intensity lamp. The lamp is a 80-watt quartz-halogen type that has a built in parabolic reflector. The light beam is about 1¾ inches in diameter at the source and is capable of supplying sufficient power to the fuze from up to approximately 24 inches away. Two or 3 inch misalignments between the source and receiver at 24 inch separation can be tolerated in the system. Much of the lamps light spectrum is in the visible range but an infrared bandpass filter can be used to make the light invisible to the human eye and therefore prevent enemy sighting of the aircraft, especially at night.

The optical power receiver 34 is made up of an array of 21 silicon photo-cells mounted on the weapon. The cells are wired in series to output about 10 volts when under load and illuminated by the quartz-halogen lamp comprising the optical power source 32. The power output is about 150 milliwatts. The cells are soldered together in three rows of seven each to result in an array size of 1⅛ by 1¼. The optimum cell size for this application (taking into account cost, size power output, etc) is ½ × 1 cm.

Advantages of the aircraft-to-weapon fuze communication link as set forth above are:

(a) The system does not require any connections, other than the lugs, between the aircraft and weapon for communication with the fuze. This results in considerable savings in weapon strike-up time and increased system reliability because of not relying on the proper connections being made manually before flight;

(b) The optical system will be compatable with future all-digital weapons management computers. Since the optical system is all digital, no conversion to voltage level signals will be needed for fuze communication; and (c) The optical system is very versatile for several reasons. Since it is all digital, new weapons, which will have different fuzing commands, will only require modification of the digital data word involved. This can be accomplished by reprogramming the weapon management computer rather than requiring aircraft rewiring or avionics modification. Also, because no connections between the aircraft and weapon are needed, no specialized umbilical connectors are needed for each new weapon.

The fuze logic schematic described in FIG. 3 is a dedicated approach. The data transmitted to the fuze, via the optical link, contains actual binary equivalents to arming time and binary code fuze mode selection. If only one 16-bit word is used to transfer the information, which leaves 12-bits per data after subtracting 4 parity bits, the total amount of information handling capability is somewhat limited.

Two techniques for expanding the capability of the system are available. The first technique involves utilizing a read-only memory (ROM) in a central processor unit (CPU) incorporated in the fuze logic. The read-only memory would be manufactured with a predetermined data set which could be very large in terms of data storage capability. The data set would pertain to a specific weapon that would have its own unique requirements. The information sent over the optical link would contain an address in the ROM that contains the specific data required for the particular launch in process. The CPU would control the addressing and extraction of data from the memory. A different memory would be used for each fuze application.

Another alternative would be the use of the CPU and a non-volatile memory which would be reprogrammable. The reprogramming would be done by the ground crew prior to flight. The non-volatile memory would be a solid-state type such as metal-nitride-oxide-semiconductor (MNOS).

The optical communication link can be used for any fuzing system that requires prelaunch or during launch transmission of data.

What is claimed is:

1. An optical communications link comprising;
    information transmitting means including an optical transmitter for transmitting information in digital format via a light beam;
    power transmitting means for supplying a high-power light beam;
    power receiver means on a receiving body for receiving the high power light beam and converting the beam to electrical energy;
    information receiver means included on said receiving body for receiving the information transmitted by said information transmitting means and being powered by the electrical energy from said power receiving means; and
    data decoder means operatively coupled to said information receiver means for decoding the information transmitted in digital format.

2. An optical communication link as set forth in claim 1 wherein;
    said information transmitting means includes encoding means for receiving a binary digital word and converting it to a trinary pulse-number modulated code.

3. An optical communications link as set forth in claim 2 wherein;
    said information transmitting means comprises a light-emitting diode that is pulsed with the modulated word from the encoding means.

4. An optical communications link as set forth in claim 1 wherein;
    said information receiver means includes temporary storage means coupled to the output of said data decoder means for temporarily storing the output of said data decoder.

5. An optical communications link as set forth in claim 4 and further including;
  parity checking means operatively coupled to the output of said temporary storage means for checking the parity of the decoded data.

6. An optical communications link as set forth in claim 1 and further including;
  temporary power storage means in said receiving body.

7. An optical communications link as set forth in claim 4 and further including;
  temporary power storage means in said receiving body and having an output operatively coupled as an input to said temporary storage means.

8. An optical communications link as set forth in claim 5 and further including;
  default circuit means operatively coupled to said parity checking means for controlling the flow of data from said temporary storage means dependent on the parity check.

9. An optical communications link as set forth in claim 8 and further including;
  control register means operatively receiving the output of the temporary storage means via the parity checking means and default circuit means for storing the decoded digital word and removing parity bits therefrom.

* * * * *